United States Patent [19]

Pawelzick

[11] 4,277,653

[45] Jul. 7, 1981

[54] SPEAKER ADAPTER

[76] Inventor: George K. Pawelzick, 16362 Aztec Ridge Rd., Los Gatos, Calif. 95030

[21] Appl. No.: 34,248

[22] Filed: Apr. 30, 1979

[51] Int. Cl.³ .......................... H04R 1/28; H04M 1/04

[52] U.S. Cl. ............................ 179/146 E; 179/1 VE; 181/150; 248/27.1

[58] Field of Search ............ 179/146 E, 1 VE, 146 R, 179/179, 1 E; 181/150; 248/27.1

[56] References Cited

U.S. PATENT DOCUMENTS

| | | | |
|---|---|---|---|
| 4,032,725 | 6/1977 | Mc Gee | 179/146 R |
| 4,143,249 | 3/1979 | Cinquino | 179/146 E |
| 4,166,933 | 9/1979 | Cinquino | 179/146E |

*Primary Examiner*—Thomas A. Robinson
*Attorney, Agent, or Firm*—Gerald L. Moore

[57] ABSTRACT

An adapter for use primarily in mounting a high fidelity speaker in the door of a vehicle.

4 Claims, 5 Drawing Figures

SPEAKER ADAPTER

BACKGROUND OF THE INVENTION

With the use of high fidelity systems in automobiles it is common to mount speakers on the inside panel of the front doors to obtain the stereo sound effect for the driver and front seat passengers. Difficulties arise in the installation because such speakers frequently have dimensions greater than the thickness of the door. The better speakers utilize larger magnetic coils and magnets which increase the depth of the speaker.

In addition the inside panels of a door frequently are not flat but are rounded or otherwise contoured both to accommodate the inside window mechanism and for appearance purposes. If the speaker is bolted to an uneven surface, bending or flexing of the speaker mounting ring can result in the distortion of the speaker cone. Such cone distortion adversely affects the quality of sound generated by the speaker.

It is the purpose of the present invention to provide an adapter which enables the simple and easy mounting of the speaker on the inside door panel of a vehicle.

SUMMARY OF THE INVENTION

An adapter is provided for mounting a sound speaker on a planar panel having an opening to receive the speaker, and wherein the speaker comprises a coil assembly, a cone diaphragm having an outer diameter, and a mounting ring fixed to the outer periphery of the cone and having an inside configuration approximating that of the cone outer diameter and a slightly larger outer diameter. The mounting ring has a plurality of holes extending therethrough in a direction parallel to the axis of rotation of said cone through which bolts can be inserted for mounting the speaker. The adapter includes a rigid adapter ring having an inside diameter and configuration slightly larger than the configuration of the speaker ring inside configuration and an outer diameter approximately equal to the outer diameter of the speaker ring, a plurality of first projections extending radially inward from the inner wall of the adapter ring in a position of alignment with the holes extending through the speaker ring and having holes therethrough aligning with the holes through the speaker ring, and a plurality of second projections extending radially inward from the inner wall of the adapter ring and positioned between the first projections thereon, said second projections having holes therethrough extending parallel to the first holes for receiving bolts for attachment to the planar panel at points spaced outward from the opening therethrough for mounting the speaker on the panel.

DESCRIPTION OF THE INVENTION

Figure 1:
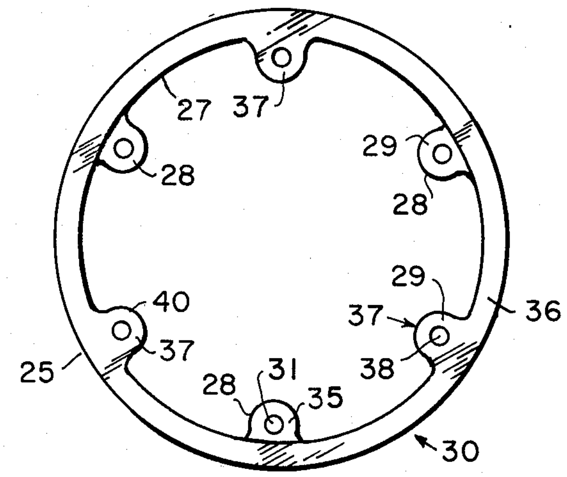
FIG. 1 is an enlarged plan view of the speaker adapter.
Figure 5:
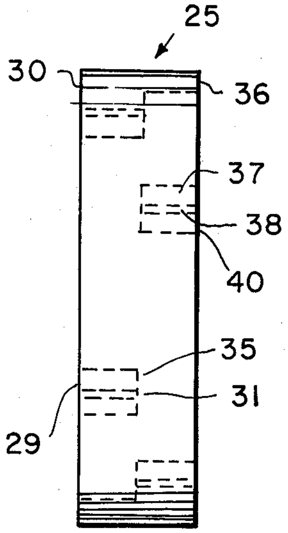
FIG. 5 is a side view of the adapter.
Figure 2:
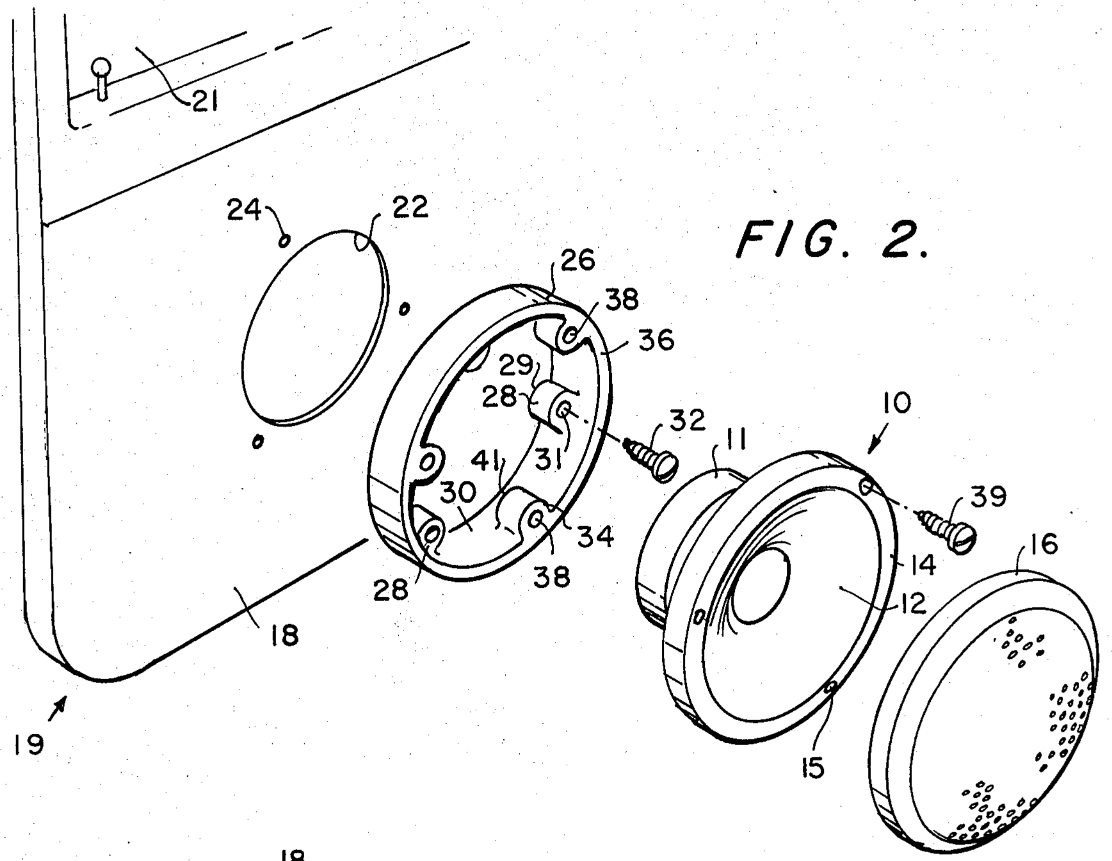
FIG. 2 is an exploded view showing the speaker and adapter ring with the vehicle door panel.

Shown in FIG. 2 is a speaker 10 comprising a coil assembly 11, a cone diaphragm 12 and a mounting ring 14. The cone diaphragm extends axially and radially from the coil assembly and is formed about an axis of rotation passing through the coil assembly with the outer diameter approximately equalling the inner diameter of the mounting ring. The mounting ring is fixed to the outer edges of the cone diaphragm and includes a plurality of holes 15 extending parallel to the axis of rotation of the cone diaphragm. A cover 16 snaps over the mounting ring and serves to protect the cone diaphragm and also to cover the bolts (not shown) utilized for mounting the speaker. In addition a cone guard 17 shown primarily in FIG. 3 extends between the coil assembly and the outer diameter of the cone diaphragm for support and protection of the diaphragm.

Figure 3:
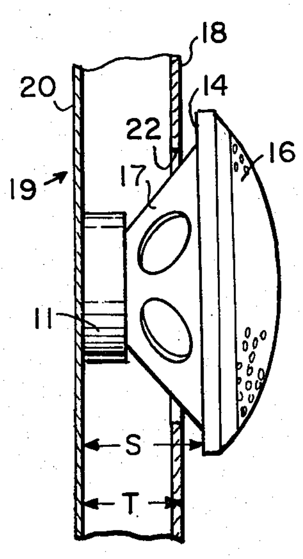
FIG. 3 is a cross-sectional view of a speaker and a door panel mounted without the adapter ring.
Figure 4:
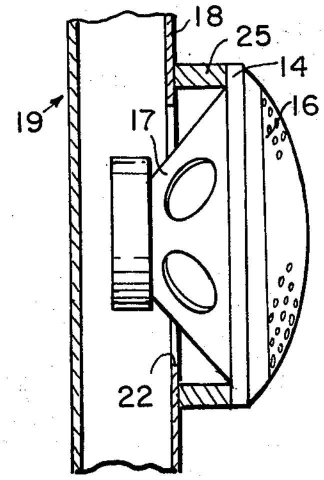
FIG. 4 is a cross-sectional view of a speaker mounted on the door panel with the adapter ring.

Such speakers are usually mounted in automobiles on the inside panel 18 of a vehicle door 19 (FIG. 2). The inside panel is usually spaced from an outside panel 20 by approximately three to four inches primarily to allow space for rolling down a window 21 of the door. Mounting of the speaker is usually achieved by cutting an opening 22 in the inner panel and drilling holes 24 therethrough coinciding with the openings 15 in the mounting ring. However as shown in FIG. 3 the distance S between the end of the coil assembly and the face of the mounting ring 14 facing the coil assembly is frequently greater than the thickness T of the door representing the clearance between the inside panel 18 and the outside panel 20. While not shown, the inside panel frequently is of a non-planar configuration thereby not presenting a planar base for the attachment of the mounting ring. Such a condition can cause bending of the mounting ring which results in distortion of the speaker cone and a poor reproduction of sound by the speaker.

In accordance with the present invention, there is provided a cylindrical adapter ring 25 which serves the multiple purposes of spacing the speaker from the inside panel sufficiently to allow space for mounting in the door while providing a rigid foundation for the speaker ring thereby accommodating any irregular configuration of the inner door panel. The adapter ring comprises a rigid ring 26 having an outer diameter approximately equal to the outer diameter of the speaker ring 14. The inner diameter of the ring is slightly larger than the outer diameter of the cone and preferably is sufficiently large to be positioned radially outward from the bolt openings 15 in the speaker ring. The ring is made of a plastic or other rigid material which is lightweight, decorative in appearance and sufficiently rigid in construction so as not to flex or bend as it is bolted against the door panel 18.

Extending from the inner surface 27 of the adapter ring is a plurality of first projections 28 having a surface 29 flush with the inner surface 30 of the ring. Extending through these projections is a plurality of first openings 31 extending parallel to the axis of rotation of the ring. Self-tapping screws 32 (FIG. 2) are passed through these openings and the openings 24 in the door inside panel 18 and held in place by speed nuts not shown for mounting the adapter ring to the door. The inner surface 29 of these first projections are flush with the surface 30 of the ring so as to provide a good foundation for mounting while the outer surface 35 is inset from the outer surface 36 of the ring so the heads of the bolts do not project further in the axial direction than the adapter ring surface and interfere with the speaker.

A plurality of second projections 37 are positioned between the first projections and extend radially inward from the inner surface of the adapter ring to serve for the mounting of the speaker on the ring. These second projections include openings 38 therethrough extending parallel to the axis of rotation of the ring and each positioned to coincide with an opening 15 in the speaker ring. Thus self-tapping screws 39 can be passed through the speaker ring and threaded into these openings for mounting the speaker onto the ring.

In use, the adapter ring is first fixed to the door inner panel 18 by passing the screws 32 through the openings 31 in the first projections and threading them into the openings 24 in the panel. With the adapter ring mounted in position, the speaker can then be fixed to the adapter ring by inserting the screws 39 through the openings 15 in the speaker ring and the openings 38 in the second projections 37. The outer surface 40 of the second projections is flush to the surface 36 of the adapter ring to provide a firm foundation for the speaker ring 14. The opposite or inward surface 41 of each second projection is spaced inward from the inner surface 30 of the adapter ring to allow room for the self-tapping screws to pass through the second projections without interference with the panel of the door.

After the speaker and adapter ring are mounted onto the vehicle door, the cover is fixed in place over the speaker to form a decorative appearance and protect the speaker. If desired, the adapter ring can be made with a sufficiently large outer diameter to coincide with the outer diameter of the cover so as to provide a smooth outer cylindrical surface.

The invention claimed is:

1. An adapter for mounting a speaker on a planar panel having an opening to receive the speaker and wherein the speaker comprises a coil assembly, a cone diaphragm and a mounting ring fixed to the outer periphery of the diaphragm and having an inside configuration equal to the cone outer configuration and an outer diameter, said mounting ring having a plurality of holes therethrough extending along the axis of rotation of said cone diaphragm and through which a screw will pass, said adapter comprising in combination:

a rigid adapter ring having an inside wall with a diameter slightly larger than the inside configuration of the mounting ring and an outer wall with a diameter approximately equal to the outer diameter of the mounting ring;

a plurality of first projections extending radially inward from the inside wall of the adapter ring and being positioned to align with the holes through the mounting ring, said projections each having a hole therethrough aligning with the holes in the mounting ring and sized for a screw to be threaded therein;

a plurality of second projections extending radially inward from the inside wall of the adapter ring and spaced between the first projections, each second projection having a hole therethrough extending parallel to the holes through the first projections whereby bolts can be inserted through the holes for attachment to the planar panel; and the first projections including surfaces facing the speaker mounting ring which are flush with the speaker facing surface of the adapter ring and including opposite facing surfaces that are inset from the corresponding surface of the adapter ring facing the planar panel.

2. An adapter as defined in claim 1 wherein the second projections include surfaces facing the panel that are flush with the corresponding surface of the adapter ring and include opposite surfaces that are inset from the corresponding other surface of the adapter ring.

3. The method of mounting a speaker having a cone diaphragm onto a surface having an opening therethrough of sufficient size to receive the cone diaphragm, said speaker also having a coil assembly and a mounting ring with an outer diameter and being fixed to the outer periphery of the diaphragm with the mounting ring including a plurality of holes therethrough along axes extending parallel to the axis of rotation of the cone diaphragm, said method comprising the steps of:

providing a rigid planar adapter ring having an outer surface extending parallel to the axis of rotation thereof and having an outer diameter similar to the outer diameter of the speaker mounting ring and including a center opening of sufficient size to encompass the cone diaphragm and also having an axial extending thickness equal to or exceeding the radial thickness of the adapter ring with a plurality of first holes therein suitable for threaded screws to be threaded therein and extending parallel to the adapter ring axis of rotation with a plurality of second parallel extending holes of sufficient size that screw bodies can extend freely therethrough;

fixing said rigid adapter ring to said surface with said surface opening and said adapter ring opening aligned by the passage of screws through said adapter ring second holes and threading said screws into said surface;

fixing said speaker on said adapter ring with the cone diaphragm extending through the surface opening and adapter opening positioned to direct sound away from said surface by inserting screws through the speaker mounting ring holes and threading said screws into the adapter ring first holes to firmly fix said speaker to said adapter ring in a position with the mounting ring being spaced in front of said surface and said adapter ring serving as a planar support for the speaker.

4. An adapter for mounting a speaker having a cone diaphragm on a panel having an opening to receive the cone diaphragm and wherein the speaker comprises a coil assembly and a mounting ring fixed to the outer periphery of the cone diaphragm with holes in the mounting ring extending along the axis of rotation of the ring and through which screws can be passed, said adapter comprising:

a rigid planar adapter ring of approximately the same size as said mounting ring but having a thickness in the axial direction equal to or greater than the radial thickness and having a plurality of first axially extending holes therethrough suitable for threaded screws to be threaded therein and a plurality of second axially extending holes through which screws or bolts may be extended whereby the adapter can be mounted onto the panel by extending bolts or screws through said second holes and said panel and thereafter said speaker can be mounted thereon with the cone diaphragm extending through the panel opening and said adapter ring by passing screws through the speaker mounting ring and threading said screws into said adapter ring first holes to firmly fix said speaker onto said planar ring with the speaker positioned to emanate sound away from said panel.

* * * * *